United States Patent [19]

Cunningham, Jr.

[11] 4,049,262
[45] Sept. 20, 1977

[54] USER-ACTUATED SIMULATED MOTORCYCLE RIDE

[76] Inventor: Jere P. Cunningham, Jr., 1190 Central Ave., Memphis, Tenn. 38104

[21] Appl. No.: 677,019

[22] Filed: Apr. 14, 1976

[51] Int. Cl.² ............... A63G 31/00; G09B 9/04
[52] U.S. Cl. .......................... 272/1 R; 35/11; 272/52
[58] Field of Search ............ 272/52, 52.5, 53.1, 272/53.2, 54, 55, 56, 73, 16, 17, 33 B, 33 R, 34, 35; 35/11 R, 11 A; 280/218, 219, 293, 295, 30, 7.17

[56] References Cited

U.S. PATENT DOCUMENTS

| 819,878 | 5/1906 | Grindy | 272/52 X |
|---|---|---|---|
| 1,289,382 | 12/1918 | Brurock | 272/52 |
| 2,007,852 | 7/1935 | Fuller | 272/52 |
| 2,743,104 | 4/1956 | Dodson | 272/53.2 X |
| 3,168,310 | 2/1965 | Strausser | 272/54 |
| 3,220,726 | 11/1965 | Koller et al. | 272/52 |
| 3,423,085 | 1/1969 | Koller et al. | 272/53.2 |
| 3,526,042 | 9/1970 | Nelson | 35/11 R |
| 3,686,776 | 8/1972 | Dahl | 35/11 R |

Primary Examiner—Richard C. Pinkham
Assistant Examiner—Arnold W. Kramer
Attorney, Agent, or Firm—John R. Walker, III

[57] ABSTRACT

A device that the user thereof can activate so as to simulate the ride of a motorcycle. A body having a shape substantially similar to the shape of a motorcycle for supporting the user of the device is movably attached to a base in a manner so as to allow the user thereof to selectively rotate the body a limited amount and to selectively move the body up and down a limited amount and back and forth a limited amount, or any combination thereof, thereby allowing the user thereof to selectively cause the device to simulate the ride of a motorcycle.

10 Claims, 8 Drawing Figures

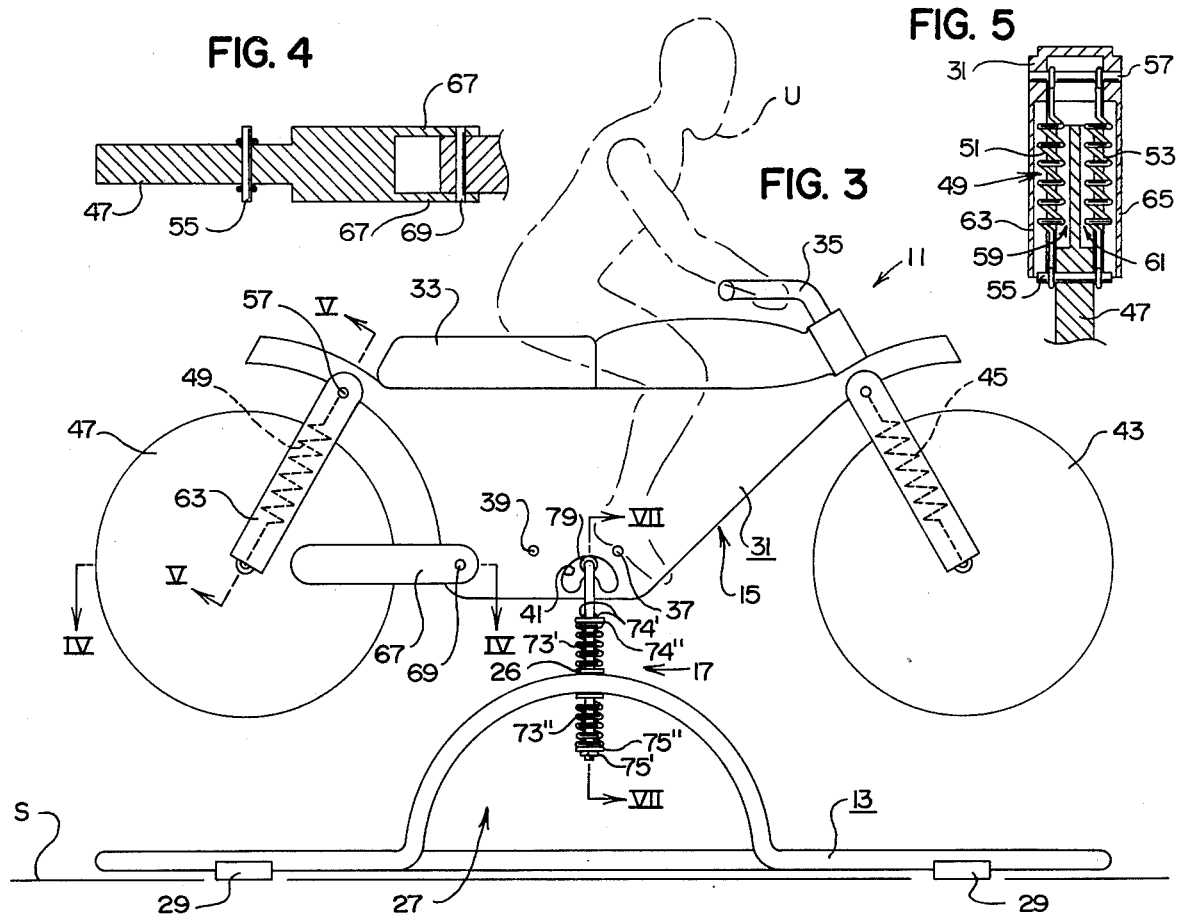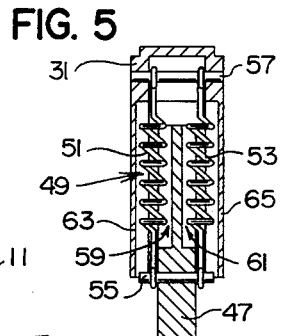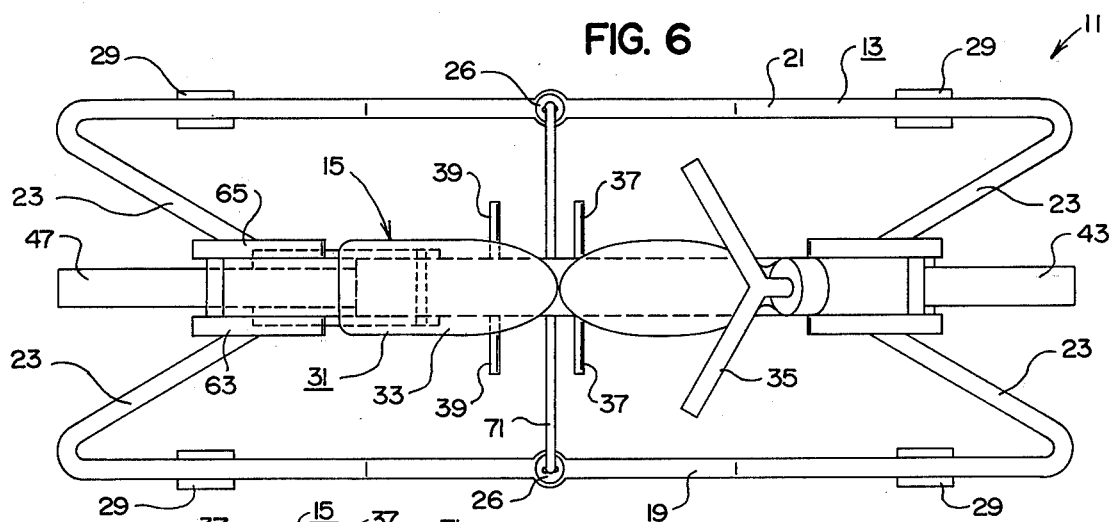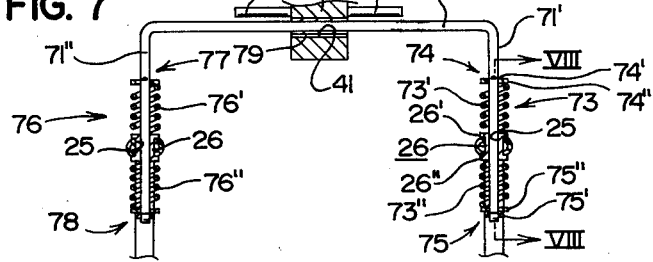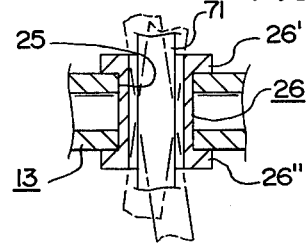

USER-ACTUATED SIMULATED MOTORCYCLE RIDE

BACKGROUND OF THE INVENTION

1. Field of the Invention

This invention relates generally to user activated riding toys and more specifically to a user activated device that simulates the ride of a real motorcycle.

2. Description of the Prior Art

Heretofore, various user activated riding toys have been developed. See, for example, Gollon, U.S. Pat. No. 459,282; Magee, U.S. Pat. No. 991,334; Dwyer, U.S. Pat. No. 2,680,020; Dadson, U.S. Pat. No. 2,743,104; Shone, U.S. Pat. No. 2,756,051; Deady, U.S. Pat. No. 2,882,050; Barthel, U.S. Pat. No. 2,915,312; Deady, U.S. Pat. No. 3,037,769; and Koller et al, U.S. Pat. No. 3,423,085. None of these patents disclose or suggest the present invention. More specifically, none of these patents disclose or suggest a user activated device that simulates the ride of a motorcycle.

SUMMARY OF THE INVENTION

The present invention is directed towards providing a user activated device which can be selectively moved by the user to simulate the ride of a motorcycle. One object of the present invention is to teach the user thereof the proper body movements necessary in riding a motorcycle.

The user activated device of the present invention includes base means for being supported on a supporting surface, body means having a shape substantially similar to a motorcycle for supporting the user of the user activated device, and attachment means for movably attaching the body means to the base means so as to allow the user of the user activated device to selectively rotate the body means a limited amount and to selectively move the body means up and down a limited amount and back and forth a limited amount, or any combination thereof, thereby allowing the user of the user activated device to selectively cause the user activated device to simulate the ride of a real motorcycle. That is, the user of the user activated device can selectively cause the body means thereof to simulate rear end wheelies, front end nose dives, sideward tilts, and the like, such as those that can be performed on a real motorcycle.

BRIEF DESCRIPTION OF THE DRAWINGS

FIG. 3 is a side elevational view substantially similar to FIGS. 1 and 2 but with the body means simulating a level ride.

FIG. 4 is a sectional view of a portion of the body means as taken on line IV—IV of FIG. 3.

FIG. 5 is a sectional view of a portion of the body means is taken on line V—V of FIG. 3.

FIG. 6 is a top plan view of the user activated device of the present invention.

FIG. 7 is a partial sectional view of the user activated device as taken on line VII—VII of FIG. 3.

FIG. 8 is a partial sectional view of the user activated device as taken on line VIII—VIII of FIG. 7.

DESCRIPTION OF THE PREFERRED EMBODIMENT

Figure 1:
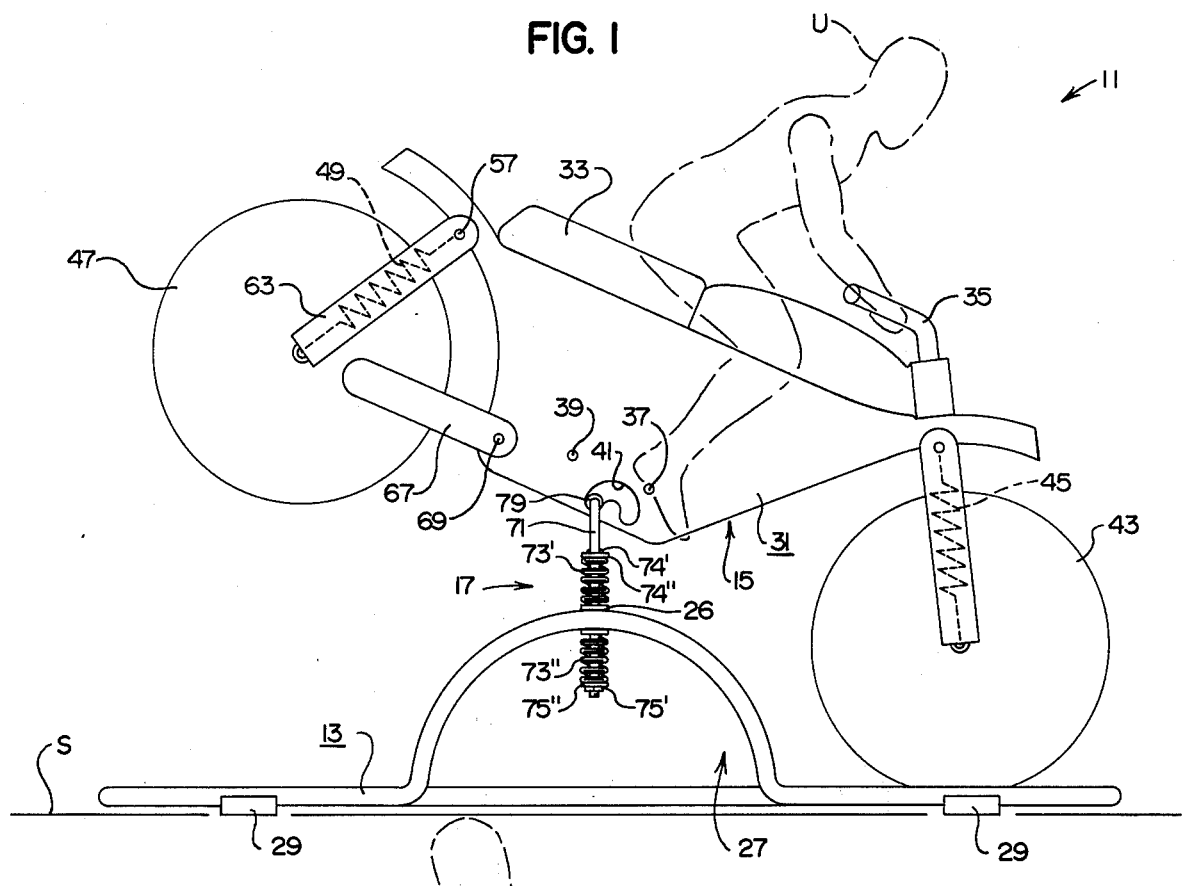
FIG. 1 is a side elevational view of the user activated device of the present invention showing the user thereof in broken lines and showing the body means thereof simulating a front end nose dive.

The user activated device 11 of the present invention is for simulating the ride of a real motorcycle to allow a child too young to ride a real motorcycle to safely particpate in many of the thrills of wheelies, jumps, and balance riding such as can be performed on a real motorcycle. The user activated device 11 also teaches such a child the proper body movements, balance and control necessary in riding a real motorcycle so as to prepare the child for the day when he is old enough to ride a real motorcycle. The user activated device 11 includes, in general, base means 13 supported on a supporting surface S such as a floor or the ground, body means 15 for supporting the user U of the user activated device 11, and attachment means 17 for movably attaching the body means 15 to the base means 13.

The base means 13 preferably has a substantially wide supporting surface engaging portion for preventing the user activated device 11 from inadvertently turning over while being used. Preferably, the base means 13 includes a tubular metal frame or the like. The tubular metal frame of the base means 13 preferably includes a pair of side members 19, 21 spaced apart from one another a sufficient distance so as to create the substantially wide supporting surface engaging portion (see FIG. 6). The side members 19, 21 are preferably fixedly attached to one another by cross members 23 or the like. It should be noted that the side members 19, 21 and cross members 23 may be joined to one another by bolts, screws or the like or may be integrally formed as a one piece unit. Each of the pair of side members 19, 21 preferably has an aperture 25 therethrough substantially intermediate each end thereof for reasons which will hereinafter become apparent. The base means 13 preferably includes a bushing member 26 provided in each of the apertures 25 for reasons which will hereinafter become apparent. Each bushing member 26 preferably includes an upper flange 26' and a lower flange 26" (see FIGS. 7 and 8). It should be noted that the flanges 26', 26" may consist of washers or the like and may be formed separate from the remainder of the bushing member 26. The bushing member 26 is preferably formed of a nylon material or the like. The intermediate portion of each side member 19, 21 is preferably provided with an upward extending arc like portion 27. The apertures 25 through the side members 19, 21 are preferably located at the highest portion of each arc like portion 27 so that each aperture 25 will be raised above the supporting surface S for reasons which will hereinafter become apparent. The base means 13 may include a plurality of rubber skid pads 29 or the like attached to the ground engaging portions of the metal frame to help prevent the user activated device 11 from moving upon the supporting surface S while in use.

Figure 2:
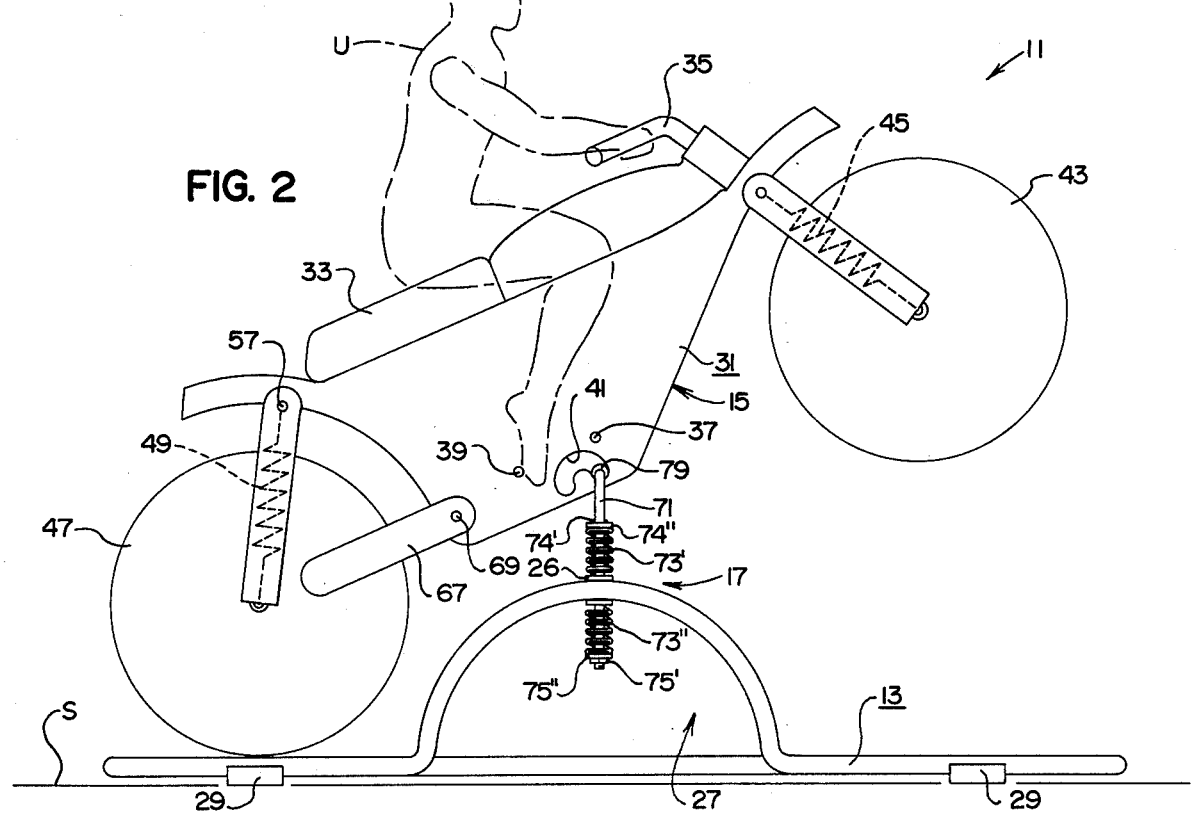
FIG. 2 is a side elevational view substantially similar to FIG. 1 but with the body means simulating a rear end wheelie.

The body means 15 has a shape substantially similar to a real motorcycle (see FIGS. 1, 2 and 3). More specifically, the body means 15 includes a central body member 31 having a seat portion 33 for supporting the user of the user activated device 11 in substantially the same manner as the seat portion of a real motorcycle supports the rider thereof. The central body member 31 also includes a handlebar portion 35 for allowing the user of the user activated device 11 to grip the body means 15 in a manner substantially similar to the rider of a real motorcycle. The central body portion 31 may also include various portions to simulate the fenders, gas tank, motor, etc., of a real motorcycle. A pair of foot rest portions 37, 39 are preferably provided on each side of the central body member 31 for reasons which will hereinafter become apparent. An elongated slot 41 is preferably provided in the central body member 31 for reasons which will hereinafter become apparent. The elongated slot 41 is preferably substantially arc shaped with the midportion thereof higher than either end thereof substantially as shown in the drawings. The body means 15 also includes a front wheel member 43 and includes a first spring means 45 for movably attaching the front wheel member 43 to the central body member 31. Additionally, the body means 15 preferably includes a rear wheel member 47 and preferably includes a second spring means 49 for movably attaching the rear wheel member 47 to the central body member 31. The manner in which the first and second spring means 45, 49 movably attach the front and rear wheel members 43, 47 to the central body member 31 is substantially identical and a detailed description of one should be sufficient for both. FIG. 5 shows a detailed view of the manner in which the second spring means 49 movably attaches the rear wheel member 47 to the central body member 31. It can be seen that the second spring means 49 includes first and second spring members 51, 53. One end of the first and second spring members 51, 53 is attached to the rear wheel member 47 by a pin 55 or the like while the other end of the first and second spring members 51, 53 is attached to the central body member 31 by a pin 57 or the like. Preferably, the rear wheel member 47 is provided with first and second dished out portion 59, 61 adjacent the length of the respective first and second spring members 51, 53 to act as guide portions for guiding the first and second spring members 51, 53 in a manner which will hereinafter become apparent. Additionally, the central body member 31 may include first and second arm portions 63, 65 for extending substantially the entire length of the respective first and second spring members 51, 53 to coact with the first and second dished out portions 59, 61 to aid the first and second dished out portions 59, 61 in guiding the first and second spring members 51, 53 to prevent the first and second spring members 51, 53 bowing in and out when activated. It should be noted that the first and second arm portions 63, 65 may be formed so as to resemble the shock absorber members of a real motorcycle. It should be noted that the rear wheel member 47 may include a pair of extension members 67 extending therefrom for allowing the rear wheel member 47 to be pivotally attached to the central body member 31 by means of a pin 69 or the like (see FIG. 4). The central body member 31, front wheel member 43 and rear wheel member 47 are preferably molded of a plastic material in any manner well known to those skilled in the art.

The attachment means 17 movably attaches the body means 15 to the base means 13 in a manner so as to allow the user U of the user activated device 11 to selectively rotate the body means 15 a limited amount and to selectively move the body means 15 up and down a limited amount and back and forth a limited amount, or any combination thereof, thereby allowing the user U of the user activated device 11 to selectively cause the user activated device 11 to simulate the ride of a real motorcycle. The attachment means 17 preferably includes a guide member 71 positioned in the elongated slot 41 of the central body member 31 of the body means 15 for back and forth movement therein. The attachment means 17 also preferably includes spring means for attaching the guide member 71 to the base means 13. More specifically, the guide member 71 preferably includes downwardly directed end portions 71', 71" and the spring means preferably includes a first spring means 73 for attaching the downwardly directed end portion 71' of the guide member 71 to the base means 13 and preferably includes a second spring means 76 for attaching the downwardly directed end portion 71" of the guide means 71 to the base means 13 (see FIG. 7). The first spring means 73 preferably includes an upper spring member 73' and a lower spring member 73" for attaching the downwardly directed end portion 71' of the guide member 71 to the base means 13 in the manner shown in FIG. 7. That is, the upper spring member 73' is preferably positioned between the upper flange 26' of the bushing member 26 and a stop means 74 provided on the downwardly directed end portion 71' of the guide member 71. The stop means 74 may consist of one or more projection members 74' provided on the downwardly directed end portion 71' and a washer 74" or the like. The lower spring member 73" is preferably positioned between the lower flange 26" of the bushing member 26 and a stop means 75 provided on the downwardly directed end portion 71' of the guide member 71. The stop means 75 may consist of a nut 75' threadingly received on the lowermost portion of the downwardly directed end portion 71 and a washer 75". The second spring means 76 preferably includes an upper spring member 76' and a lower spring member 76" for attaching the downwardly directed end portion 71" of the guide member 71 to the base means 13 in the manner shown in FIG. 7. Stop means 77, 78 are provided for coacting with the upper and lower spring members 76', 76" respectively in the same manner as the stop means 74, 75 coact with the upper and lower spring members 73', 73" respectively. The attachment means 17 preferably includes a roller member 79 mounted on the guide member 71 for aiding the guide member 71 in moving back and forth in the elongated slot 41 of the central body member 31 of the body means 15. The roller member 79 may be constructed in any manner well known to those skilled in the art. For example, the roller member 79 may consist of a nylon bushing or the like positioned on the guide member 71 in a manner so as to freely rotate around the guide member 71 as the user U of the user activated device 11 causes the body means 15 to move up and down and/or back and forth relative to the base means 13. The outer diameter of the roller member 79 is preferably slightly less than the height of the elongated slot 41 in the central body member 31 of the body means 15 so that the roller member 79 can freely move back and forth in the elongated slot 41 while being prevented from any substantial up and down movement relative to the elongated slot 41. Preferably, each downwardly directed end portion 71', 71" of the guide member 71 extends through one of the bushing member 26 of the base means 13. The bushing members 26 allow the downwardly directed end portions 71', 71" of the guide member 71 to freely slide up and down. Preferably, the exterior diameter of the downwardly directed end portions 71', 71" of the guide member 71 is somewhat smaller than the interior diameter of the pair of bushing members 26 of the base means 13 to allow the downwardly directed end portions 71', 71" to freely move within the pair of bushing members 26 in directions as indicated by broken lines in FIG. 8.

To use the user activated device 11 of the present invention, the user U mounts the body means 13 thereof in substantially the same manner one would mount a real motorcycle, i.e., with his body resting upon the seat portion 33, with his feet resting upon the front or rear foot rest portions 37, 39 and with his hands gripping the handlebar portion 35. By moving his body properly, the user U can then cause the body means 15 of the user activated device 11 to simulate the ride of a real motorcycle during rear end wheelies, front end nose dives, sideward tilts, and the like. More specifically, by placing his feet on the forward foot rest portions 37 and by pressing forward on the handlebar portions 35, the user U can cause the body means 15 to tilt forward with the front wheel member 43 substantially engaging the supporting surface S thereby simulating a front end nose dive as shown in FIG. 1 with the guide member 71 located at substantially the rearwardmost portion in the elongated slot 41. Likewise, by placing his feet on the rearward foot rest portions 39 and by pulling rearwardly on the handlebar portions 35, the user U can cause the body means 13 to tilt rearwardly with the rear wheel member 47 substantially engaging the supporting surface S thereby simulating a rear wheel wheelie as shown in FIG. 2 with the guide member 71 located at substantially the forwardmost position in the elongated slot 41. Likewise, by pressing downwardly on one of the foot rest portions 37, 39 and by pressing sidewards on the handlebar portion 35, the user U can cause the body means 13 to tilt sidewards with the downwardly directed end portions 71', 71" of the guide means 71 located at an angle relative to the longitudinal axes of the bushing members 26 as shown in FIG. 8. It should be noted that the spring means 45, 49, 73, 76 will coact with one another when the user U causes the body means 15 to move relative to the base means 13 to impart a "live" motion to the device 11.

As thus constructed and used, the present invention provides a user activated device which simulates the feel and dynamic potential of a real motorcycle in motion while teaching the user thereof the proper body movements necessary in riding a real motorcycle.

Although the invention has been described and illustrated with respect to a preferred embodiment thereof, it is not to be so limited since changes and modifications may be made therein which are within the full intended scope of the invention.

I claim:
1. A user-activated device for simulating the ride of a motorcycle, said user-activated device comprising:
   a. base means for being supported on a supporting surface;
   b. body means having a shape substantially similar to a motorcycle for supporting the user of said user-activated device, said body means having an elongated slot provided substantially transversely through said body means and extending substantially lengthwise of said body means with the midportion of said slot higher than either end thereof; and
   c. attachment means for movably attaching said body means to said base means, said attachment means including a substantially inverted U-shaped guide member having a normally horizontally extending midportion for extending substantially transversely through said slot of said body means and including a normally vertically extending end portion extending from each end of said midportion, said attachment means including resilient supporting means for movably and resiliently attaching said vertically extending end portions to said base means to thereby movably attach said body means to said base means for allowing the user of said user-activated device to selectively rotate said body means a limited amount and to selectively move said body means up and down a limited amount and back and forth a limited amount thereby allowing the user of said user-activated device to selectively cause said user-activated device to simulate the ride of a motorcycle, said attachment means normally providing the sole support of said body means above said base means.

2. The user-activated device of claim 1 in which said resilient supporting means include spring means for movably attaching said guide member to said base means.

3. The user-activated device of claim 2 in which said elongated slot is substantially arc-shaped with the midportion thereof higher than either end thereof.

4. The user-activated device of claim 3 in which said attachment means includes a roller member mounted on said midportion of said guide member within said slot for aiding said body means in moving back and forth relative to said guide member.

5. The user-activated device of claim 4 in which the diameter of said roller member is slightly less than the height of said elongated slot so that said body means can freely move back and forth relative to said guide member.

6. The user-activated device of claim 5 in which said spring means includes a first spring means for attaching one of said end portions of said guide member to said base means and includes a second spring means for attaching the other of said end portions of said guide means to said base means.

7. A user-activated device for simulating the ride of a motorcycle to teach the user thereof the proper body movement necessary in riding a motorcycle, said user-activated device comprising:
   a. base means for being supported on a supporting surface, said base means having a substantially wide supporting surface engaging portion for preventing said user-activated device from turning over;
   b. body means having a shape substantially similar to a motorcycle, said body means including a central body member having a seat portion for supporting the user of said user-activated device and having an elongated slot provided substantially transversely through said body means and extending substantially lengthwise of said body means, said elongated slot being arc-shaped with the midportion thereof being higher than either end thereof, said body means including a front wheel member and a rear wheel member, said body means including first spring means for movably attaching said front wheel member to said central body member and including second spring means for movably attaching said rear wheel member to said central body member; and
   c. attachment means for movably attaching said body means to said base means, said attachment means including a substantially inverted U-shaped guide member having a normally horizontally extending midportion for extending substantially transversely through said elongated slot in said central body member of said body means and having a downwardly directed, normally vertically extending end portion extending from each end of said midportion of said guide member for being movably attached to said base portion to thereby movably attach said body means to said base means, said guide member including a roller member mounted on said midportion of said guide member for aiding said body means in moving back and forth relative to said guide member, said attachment means including spring means for movably attaching said guide member to said base means, whereby the user of said user-activated device can selectively move his body to cause said user-activated device to simulate the ride of a motorcycle during rear end wheelies, front end nose dives, and sideward tilts, said attachment means normally providing the sole support of said body means above said base means.

8. The user-activated device of claim 7 in which said spring means includes a first spring means for attaching one of said downwardly directed end portions to said base means and a second spring means for attaching the other of said downwardly directed end portions to said base means.

9. The user-activated device of claim 8 in which said base means includes a pair of side members, each of said pair of side members having an aperture therethrough substantially intermediate each end thereof for receiving one of said downwardly directed end portions of said guide member of said attachment means, and in which said base means includes a pair of bushing members with one of said bushing members positioned in each of said apertures through said side members of said base means for allowing said downwardly directed end portions of said guide means to slide up and down.

10. The user-activated device of claim 9 in which the interior diameter of said pair of bushing members is somewhat larger than the exterior diameter of said downwardly directed end portions of said guide member to allow said downwardly directed end portions to freely move within said pair of bushing members.

* * * * *